(No Model.)

W. SHELLY.
MACHINE FOR DRAWING SPOKES.

No. 400,127. Patented Mar. 26, 1889.

Witnesses:
Harry T. Jones.
Robert A. Millar.

Inventor:
William Shelly,
By West & Bond
Attys.

UNITED STATES PATENT OFFICE.

WILLIAM SHELLY, OF CHICAGO, ILLINOIS, ASSIGNOR TO HIMSELF AND GEORGE OSWALD, OF SAME PLACE.

MACHINE FOR DRAWING SPOKES.

SPECIFICATION forming part of Letters Patent No. 400,127, dated March 26, 1889.

Application filed September 3, 1888. Serial No. 284,449. (No model.)

*To all whom it may concern:*

Be it known that I, WILLIAM SHELLY, residing at Chicago, in the county of Cook and State of Illinois, and a citizen of the United States, have invented a new and useful Improvement in Machines for Drawing Spokes, of which the following is a specification, reference being had to the accompanying drawings, in which—

Figure 1:
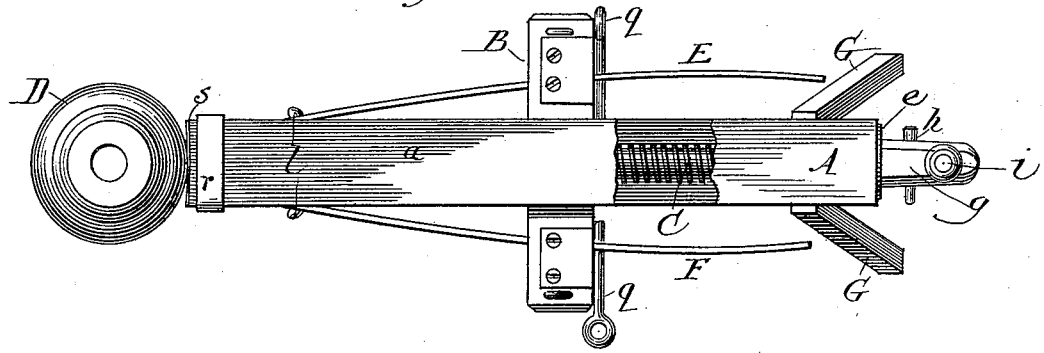
Figure 2:
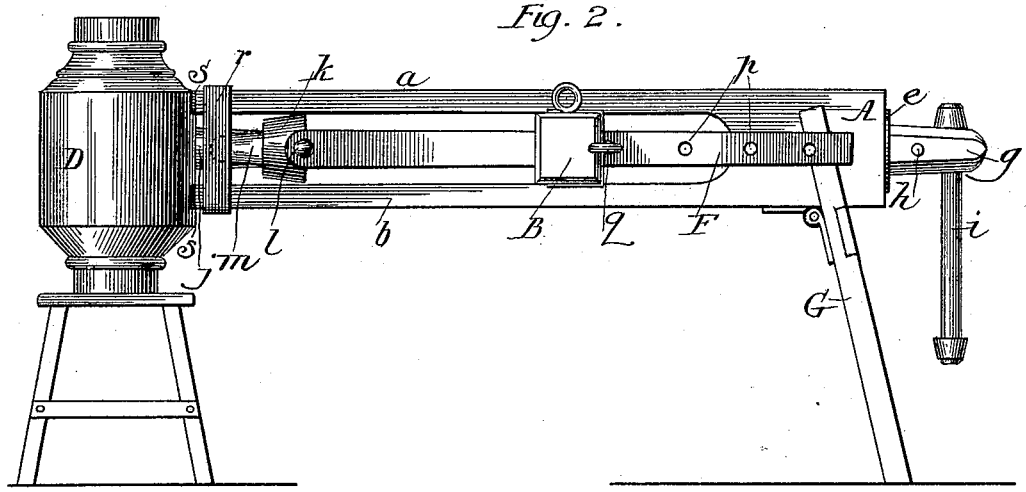
Figure 3:
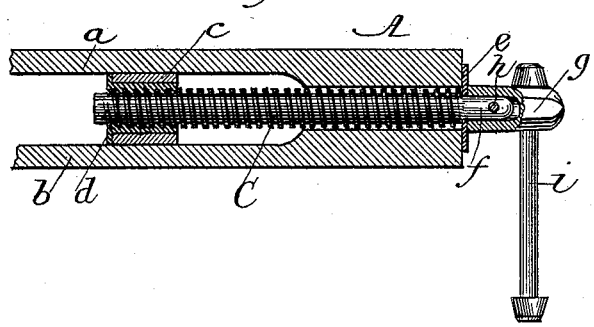
Figure 4:
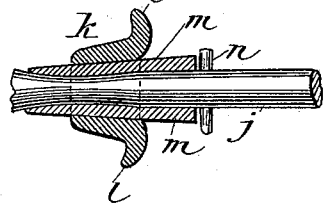

Figure 1 is a plan. Fig. 2 is a side elevation. Fig. 3 is a central vertical longitudinal section through a part of the machine. Fig. 4 is a detail, being a horizontal section through the collar and wedges, part of the spoke being shown in elevation.

In repairing wheels which have spokes it is frequently necessary to remove one or more of the spokes from a hub.

The primary object of my invention is to provide a machine by the use of which spokes can be readily withdrawn from hubs, which I accomplish as illustrated in the drawings and hereinafter described.

Those things which I claim as new will be set forth in the claims.

In the drawings, A represents a block, which is solid, except that it is provided with a longitudinal hole, as shown in Fig. 3, to receive one end of a screw.

$a\ b$ are two arms extending out from the block A, which arms are, as shown, integral with the block.

B is a sliding cross-bar located between the arms $a\ b$.

$c$ is a nut in the center of the bar B, having, as shown, at one end a shoulder, $d$.

C is a screw which fits the nut $c$. The hole in the block A, through which the screw passes, is not screw-threaded.

$e$ is a plate secured to the end of the block A, in which plate there is a hole to receive the end $f$ of the screw, and, as shown, the thread of the screw comes in contact with the inside of this plate $e$.

$g$ is a socket-piece which receives the end $f$ of the screw, upon which it is secured by a pin, $h$.

$i$ is a handle for rotating the screw.

D is the hub of a wheel which, as shown, is supported on a bench.

$j$ is a spoke or part of a spoke in the hub. Only one spoke is shown in the drawings, that being sufficient to illustrate the use of my invention.

$k$ is a collar the interior surface of which is tapering.

$l\ l$ are two hooks on opposite sides of the collar $k$.

$m$ are two wedges, the inner surfaces of which may be roughened to prevent them from slipping on the spoke. The collar and wedges serve the purpose of a clamp.

$n$ is a pin which passes through the spoke, which may be used, if necessary, to prevent the wedges from slipping.

E F are two bars. The bar E passes loosely through a slot near one end of the bar B, and the bar F passes through a slot near the other end of such bar. The inner end of each bar E F is provided with a hole adapted to receive one of the hooks $l$ on the collar $k$. Each bar is provided with a series of holes, $p$, to receive the pins $q$.

G are legs to support the block A. As shown, these legs are hinged to the block and can be folded up when the device is not in use; but they may be connected with the block in any suitable manner.

$r$ is a metal band which encircles the arms $a\ b$, and may be used, if necessary, to prevent the free ends of the arms $a\ b$ from spreading apart. The ends of the arms may be faced with leather or rubber (indicated by $s$) for the purpose of preventing the face of the hub from being injured by the ends of the arms.

In use the collar $k$ is to be placed upon the spoke to be drawn out, and the wedges $m$ are to be inserted between the collar and spoke, substantially as shown in Fig. 4. The pins $q$ are to be removed from the holes $p$, and then the holes at the inner ends of the bars E F can be made to engage with the hooks $l$ on the collar $k$, the cross-bar and screw having been advanced well forward, as shown in Fig. 3. The pins $q$ are then to be inserted in one of the holes $p$ in each bar E F as near as possible to the cross-bar B. Then by rotating the screw the cross-bar B will be moved toward the outer end of the machine, and this bar coming or being in contact with the pins $q$, the power of the screw will be exerted through the bars E F upon the collar $k$, and through the collar $k$ and wedges upon the spoke, which will be readily drawn from the hub, the inner ends of the arms $a\ b$ being in contact therewith and preventing the hub from moving. When the pins are withdrawn, the bars E F can be moved in the slots in the bar B, as may be necessary to engage their inner ends with the hooks $l$.

The several parts of the machine may be made of any known suitable material.

While this machine was primarily designed to be used for drawing spokes from hubs, it can be used for other purposes.

What I claim as new, and desire to secure by Letters Patent, is as follows:

1. A block, as A, provided with two arms, $a\ b$, in combination with a sliding cross-bar, B, provided with a nut, $c$, a screw, C, which fits the nut $c$ and passes through a hole which is not screw-threaded in the block A, and bars E F, which pass through slots in the cross-bar B, substantially as and for the purposes specified.

2. A block, as A, provided with two arms, $a\ b$, in combination with a sliding cross-bar, B, provided with a nut, $c$, a screw, C, which fits the nut $c$ and passes through a hole which is not screw-threaded in the block A, a clamp, as $k\ m$, adapted to be placed on a spoke or other article, and bars E F, which pass through slots in the cross-bar B and are adapted at their inner ends to engage with the clamp, substantially as and for the purpose specified.

WILLIAM SHELLY.

Witnesses:
GEORGE OSWALD,
HARRY T. JONES.